June 7, 1955

K. KORDESCH 2,710,357

BATTERY VOLTAGE CONVERTER UTILIZING CONDENSERS

Filed April 14, 1953

INVENTOR.
KARL KORDESCH
BY
Harry M. Saragovitz
ATTORNEY

June 7, 1955    K. KORDESCH    2,710,357
BATTERY VOLTAGE CONVERTER UTILIZING CONDENSERS
Filed April 14, 1953    3 Sheets-Sheet 2

INVENTOR.
KARL KORDESCH
BY
Harry M. Saragovitz
ATTORNEY

June 7, 1955 K. KORDESCH 2,710,357
BATTERY VOLTAGE CONVERTER UTILIZING CONDENSERS
Filed April 14, 1953. 3 Sheets-Sheet 3

INVENTOR.
KARL KORDESCH
BY
*Harry M. Saragovitz*
ATTORNEY

United States Patent Office 2,710,357
Patented June 7, 1955

2,710,357
BATTERY VOLTAGE CONVERTER UTILIZING CONDENSERS

Karl Kordesch, Long Branch, N. J.

Application April 14, 1953, Serial No. 348,844

2 Claims. (Cl. 307—110)

(Granted under Title 35, U. S. Code (1952), sec. 266)

The invention described herein may be manufactured and used by or for the Government for governmental purposes without the payment of any royalty thereon.

This invention relates to equipment for producing moderately high direct voltage of moderate current from a rather low direct voltage source such as a battery having a few cells. In electronic equipment, such as radios, having a low voltage battery to supply both heater and high voltage energy, it can be used instead of the common vibrator rectifier converter for providing the necessary high voltage. The simplicity and efficiency make it adaptable to various applications.

To produce very high voltages it has been fairly common to connect a bank of many condensers in parallel to a source, then re-connect them in series to the very high voltage load, or in case of a cascade system of this nature to a condenser of the second bank of condensers. Such systems involve a large number of switches, thereby adding to the complexity and contact resistance of the system, but at the high voltages and low current this can be tolerated and the insulation in such a system is readily attained.

According to this invention the condensers of each bank are permanently connected in series and are successively charged on a predetermined time schedule by a common rotating switch, which can be substantially simpler than that required to make the series connection. Furthermore, the sequential charging of the condensers tends to decrease the charging ripple, as in voltage doubler circuits which can be made with either line frequency ripple or double line frequency ripple, but in the case of the present invention the ripple may be at many times the charging frequency of any one condenser. The ripple content of the output of this device can be reduced by a judicious arrangement of the switch contacts in such a way that the various condensers of a bank are charged in sequence at fairly uniform and rather short intervals although any individual condenser may be charged only at substantial intervals. At very high voltages the insulation problem is more acute with the present invention, but can be solved by proper spacing when the other advantages are sufficient.

It will be understood that the switch must be so arranged that in any one series bank of condensers the individual elements must be charged at separate times. If the switch is constructed with only one set of contacts, to separate the input and output circuits, both can be grounded. In an isolated cascade system the bank may be in use at the same time for charging the individual elements of the next bank; but in case of any interconnection to a common ground or in adding a prior source voltage to the sum of the voltages in any one bank, care must be taken that the simultaneous use does not involve a short circuit.

By connecting the low voltage in series with the high voltage at every possible point in the network the voltage ratio may be very substantially increased. This type of connection substantially reduces the number of components needed for any given ratio. Although the size of the components may be slightly increased any cost due to increased size would be entirely negligible.

The step up ratio of each bank within the system is similar to that of an A. C. transformer because the output voltage is a product of the input voltage times the number of condensers in that bank. Since the power must be substantially the same in input and output circuits, the effective load resistance is also transformed in proportion to the square of the step up ratio the same as in an ordinary A. C. transformer. Although the device is designed principally to provide a step up ratio it can also be operated to provide a step down ratio merely by connecting the source voltage to the opposite end of the system the same as in an A. C. transformer.

The invention will be described in relation to the accompanying drawings in which.

In these figures the movable switch contacts are shown spaced slightly from the stationary contacts in order to illustrate that they are to be moved.

Figure 1:
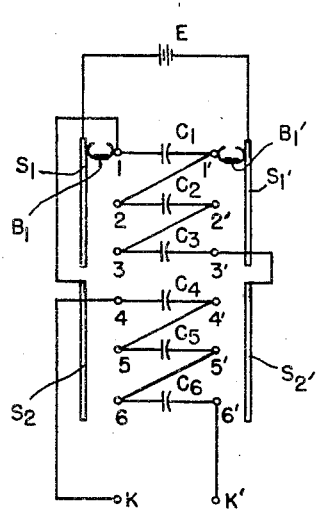
Figs. 1 to 3 show various suitable circuits utilizing two banks in cascade to perform the desired function.

Fig. 1 shows a circuit having two banks of condensers in cascade in which each bank includes three condensers in series, $C_1$ to $C_3$, and $C_4$ to $C_6$. The terminals of these condensers are connected to the corresponding switch contacts 1 to 6 and 1' to 6'. The movable contacts or bridging members of the rotating switch are indicated by the numerals $B_1$ and $B_1'$. The contact rails or slides $S_1$ and $S_1'$ of the first bank are connected to the D. C. source E. Similarly, the bank of series condensers $C_1$ to $C_3$ serves as the D. C. source for the contact rails $S_2$ and $S_2'$. The contacts 4 and 6' are connected to the output terminals K, K'. As the contacts $B_1$ and $B_1'$ rotate, the condensers $C_1$ and $C_3$ are charged to the potential of the D. C. source E and therefore the contacts 1 and 3' have a potential three times that of the source E. Similarly, the condensers $C_1$ and $C_3$ are charged from the potential across contacts 1 and 3' of the first bank and therefore the potential between the terminals 4 and 6' is three times that across the contacts 1 and 3' or nine times that of the source E. The D. C. source E and the load indicated at the terminals K and K' can be grounded if desired since the single set of contacts $B_1$ and $B_1'$ prevents any other simultaneous connection between the source E and the load K.

Figure 2:
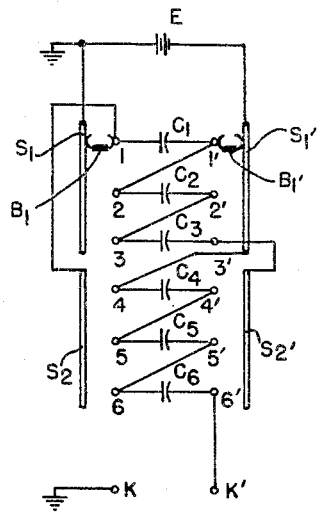

The circuit according to Fig. 2 is similar to that of Fig. 1, but the output terminal K is connected to switch terminal 4 thru the source E so that the D. C. source is in series with the second bank of condensers, and a common ground connection is shown. This interconnection is analogous to the ordinary A. C. auto-transformers, and provides a step up ratio of 9 as in Fig. 1 plus the source itself giving a total step up ratio of 10.

Figure 3:
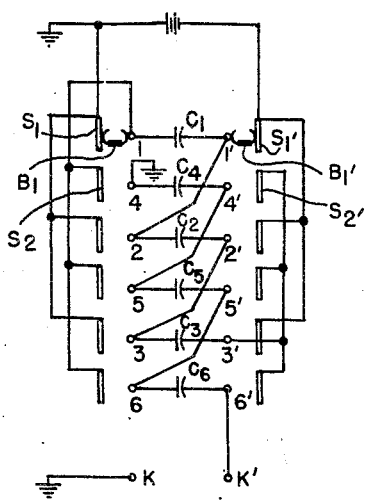

If the current drawn from the system is fairly high in proportion to the charge on the condensers there may be substantial ripple content in the output. As shown in Fig. 3 the charging of the various condensers is accomplished in alternating relation with the condensers charged in the succession $C_1$, $C_4$, $C_2$, $C_5$, $C_3$, $C_6$ and accordingly the contact rails must be divided into corresponding parts.

Figure 4:
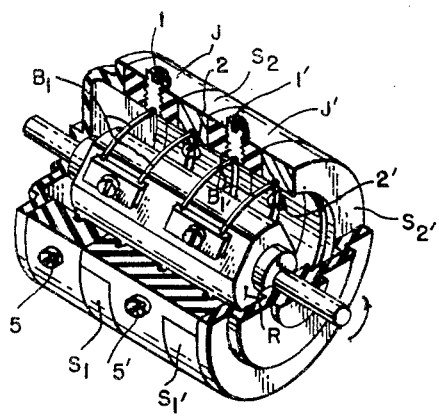
Fig. 4 shows a suitable switching mechanism.

The rotating switch device may be constructed as indicated in Fig. 4, and as shown in this figure corresponds to the device used in Figs. 1 and 2, having contact rails $S_1$, $S_1'$, and $S_2$, $S_2'$ each in the form of half circles which may be made of brass with silver plating and insulated from each other by suitable inserts. The insulating rings J, J' provide the necessary support and electrical separation for the metal contacts 1 to 6 and 1' and 6' respectively. The movable switch contacts $B_1$ and $B_1'$ may be formed from a single piece of spring material mounted on the rotor R which is formed of insulating material. In order that the ends of the contact $B_1$, $B_1'$ can maintain a good connection and thus avoid sparks, the rings $S_1$, $S_1'$, $S_2$, $S_2'$, J, and J' are provided with suitable grooves. The rotor R and the switch contacts $B_1$ and $B_1'$ may be driven by a very small motor, which may be supplied with energy from the same source of voltage E.

Figure 5:
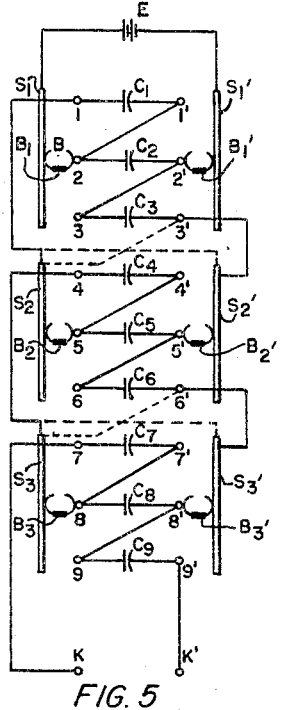
Fig. 5 shows a similar circuit to that of Figs. 1 to 3 but with three cascade banks of condensers and three sets of switching contacts.

In Fig. 5 a transformer device is shown which has three cascade banks of condensers $C_1$ to $C_3$, $C_4$ to $C_6$, and $C_7$ to $C_9$, the first two banks of which are connected as in Fig. 1. The contacts 4, 6' of the second bank are connected to the contact rails $S_3$, $S_3'$ analogous to the connection of the contacts 1 to 3' to rails $S_2$ to $S_2'$ in Fig. 1, and the load is connected to the contacts 7 and 9'. This arrangement provides a voltage ratio of 27.

Figure 6:
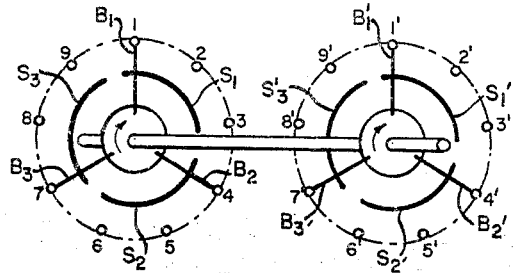
Figs. 6 to 8 show suitable arrangements of the switching contacts to provide the desired schedule of charging.
Figure 7:
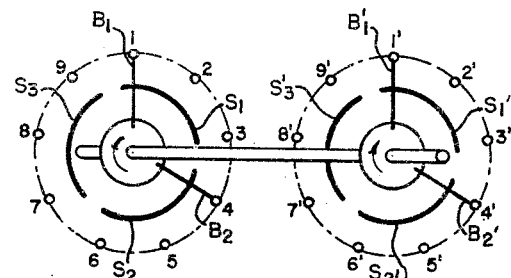
Figure 8:
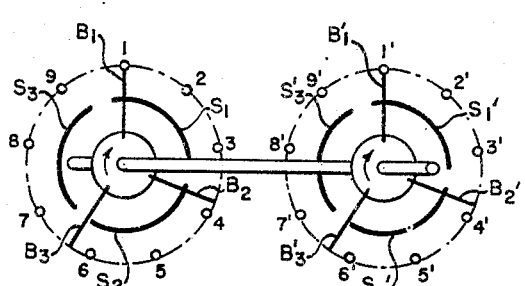
Figure 9:
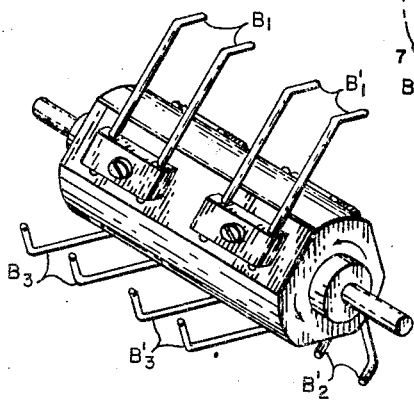
Fig. 9 shows a suitable rotor for the switching mechanism of Fig. 4.

It will also be noted that in Figs. 5 and 6 additional switch contacts $B_2$, $B_2'$, and $B_3$, $B_3'$ have been added to the circuit so that the various condensers are charged more frequently during the rotation; however, with a full set of such bridging contacts there is always an interconnection between the source E and the output K, K' and in many cases this interconnection would involve a short circuit with some other interconnection between source and output and therefore would not be permissible. The omission of one pair of these contacts would break the interconnection between source and load and yet provide more frequent charging of the condensers as indicated in Fig. 7. The ripple would be reduced in such a case by spacing the contact members at substantially equal distances, so that the successive intervals between applying a charge on each condenser would be substantially constant, and furthermore with an odd number of condensers the load on the source would be less and would occur at more frequent intervals. If the contact spacing is adequate the movable contacts may be spaced non-uniformly as in Fig. 8 so that continuity is interrupted at one or more points in every possible position. The use of the largest permissible number of moving contacts provides the lowest ripple for any given speed of rotation, capacity, etc.

Fig. 5 also serves to explain a possible source of difficulty from inherent capacity of the battery, wires, etc. With the movable contacts touching stationary contacts 1, 4, and 7 and 1', 4', and 7', the output terminal K, rails $S_1$, $S_2$, $S_3$, and one battery terminal are all joined, whereas with the movable contacts touching stationary contacts 3, 6, and 9, and 3', 6', and 9', the output terminal K', rails $S_1'$, $S_2'$, and $S_3'$ and the other battery terminal are joined. During the transition from one of these positions to the other there may be strong surges interfering with the effectiveness of the system, especially if being used for measuring purposes. The condition can be alleviated by a transposition of the connections between the rails $S_2$, $S_2'$, and $S_3$, $S_3'$ and their respective sources as indicated in the figure.

Figure 10:
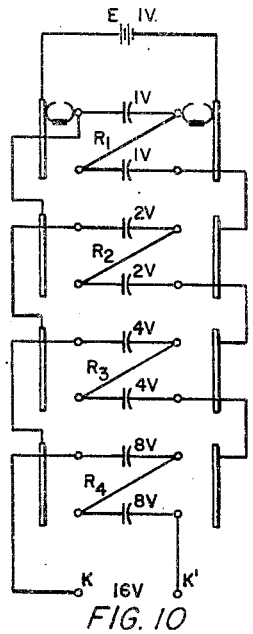
Figs. 10 to 13 illustrate the possibility of obtaining increased voltage by a series connection between the various banks.
Figure 11:
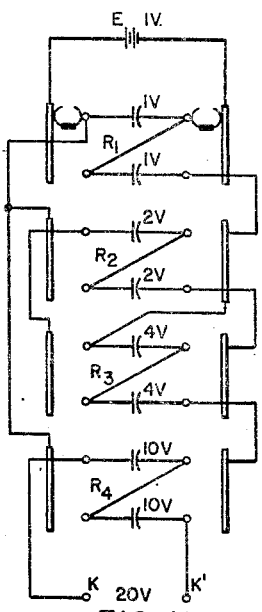
Figure 12:
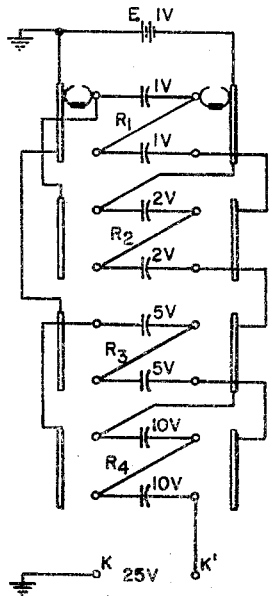
Figure 13:
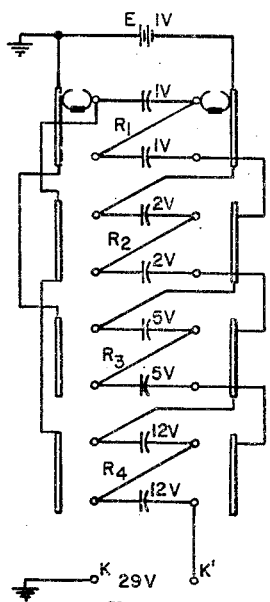

Circuits utilizing this invention are illustrated in Figs. 10 to 13, with the further addition of the source voltage as in auto-transformers shown in Figs. 11 to 13. Fig. 10 shows a four bank unit analogous to Figs. 1–3 and 5 with two condensers in each bank providing a step up ratio of 16. In Figs. 11 and 13, the output of the first bank is added to the output of the third bank as the source for the fourth bank, giving a step up ratio of 20 in Fig. 11. In Figs. 12 and 13 the source is added to the output of the second bank as the source for the third bank, and further added to the output of the fourth bank giving a step up ratio of 25 in Fig. 12 and 29 in Fig. 13. It will be understood that the input of one bank cannot be directly combined with the output of the same bank, but only with the output of a subsequent bank. Otherwise the principles may be extended to as many elements or banks as necessary to give a desired step up ratio.

The efficiency of the system compares favorably with that of A. C. transformers of moderate size—about 90%, but the motor may reduce this to approximately 80%. No filter is ordinarily required in view of the nature of the circuit.

A further use of this system is in the supply for a photoflash unit; for example, by using eight banks of condensers with two condensers in each bank the sixteen condensers make it possible to provide a step up ratio of $2^8$ or 256 with the simplest type of connection as shown in Fig. 10; therefore, a 10 volt battery would provide 2.5 kv. to apply to the charging condensers of an electronic photoflash tube. In such a case a common switch or a plurality of switches may be found desirable.

A further use of this invention might be in the field of measuring instruments particularly at very low voltage as would be common in the case of thermocouples. This system would raise the voltage to a value at which electronic amplification would become feasible.

The system might also be used to match the impedance of an indicating instrument to the impedance to an electronic amplifier with which it is to be used since most electronic amplifiers have a comparatively high impedance and most meters are inherently of rather low impedance.

The number of condensers in the various banks need not necessarily be the same as long as the switching contacts are properly arranged. It will be understood that the capacity of the condensers in the various banks is arranged with high capacity condensers of low voltage rating on the low voltage side of the system and comparatively low capacity condensers of higher voltage rating on the high voltage side.

What is claimed is:

1. A system for transforming direct voltage between a pair of high voltage terminals and a pair of low voltage terminals comprising a 1st bank of substantially equal condensers connected in series to said high voltage terminal, continuous switching means connecting a pair of intermediate voltage terminals across each condenser of said bank successively in a polarity corresponding to the series connection, a 2d bank of condensers connected in series to said intermediate voltage terminals, and switching means connecting said low voltage terminals sequentially across each condenser of said 2d bank, the connections in said first bank occurring at a time there is no connection in said second bank, and said low voltage terminals being connected in series with said first bank of condensers.

2. A system for transferring direct voltages comprising a plurality of banks of condensers, the condensers of each bank being substantially equal and connected in series to a pair of high voltage terminals of such bank, switching means successively connecting a pair of low voltage terminals of each such bank across each condenser of said bank in a polarity corresponding to the series connection, the low voltage terminals of one of said banks serving as the low voltage terminals of the system, the high voltage terminals of another of said banks serving as the high voltage terminals of the system, and the high voltage terminals of each other bank being connected to the low voltage terminals of the next succeeding bank, the connections in one of said banks occurring at a time when there is no connection in another of said banks, said low voltage terminals of one of said banks being connected in series with the high voltage terminal of that bank of which the low voltage terminals are connected to the high voltage terminals of said one bank.

References Cited in the file of this patent

UNITED STATES PATENTS

| | | |
|---|---|---|
| 1,796,254 | Nyman | Mar. 10, 1931 |
| 1,992,908 | Cockroft et al. | Feb. 26, 1935 |
| 2,462,804 | Canady | Feb. 22, 1949 |
| 2,546,035 | Lichenstein et al. | Mar. 20, 1951 |
| 2,631,249 | Smith | Mar. 10, 1953 |